United States Patent
Phillips et al.

(10) Patent No.: US 11,316,940 B1
(45) Date of Patent: Apr. 26, 2022

(54) MUSIC DISCOVERY USING MESSAGES OF A MESSAGING PLATFORM

(71) Applicant: Twitter, Inc., San Francisco, CA (US)

(72) Inventors: Stephen G. Phillips, Piedmont, CA (US); Michael Doherty, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/866,982

(22) Filed: May 5, 2020

Related U.S. Application Data

(63) Continuation of application No. 14/217,333, filed on Mar. 17, 2014, now Pat. No. 10,686,898.

(60) Provisional application No. 61/800,371, filed on Mar. 15, 2013.

(51) Int. Cl.
| | | |
|---|---|---|
| G06F 15/16 | (2006.01) | |
| H04L 67/50 | (2022.01) | |
| H04L 51/52 | (2022.01) | |

(52) U.S. Cl.
CPC .............. *H04L 67/22* (2013.01); *H04L 51/32* (2013.01)

(58) Field of Classification Search
CPC ...... H04L 67/22; H04L 51/32; H04L 63/0227
USPC ......................... 709/206, 204, 217
See application file for complete search history.

(56) References Cited

U.S. PATENT DOCUMENTS

| | | | |
|---|---|---|---|
| 6,438,579 B1 | 8/2002 | Hosken et al. | |
| 8,612,529 B1 | 12/2013 | Leibert et al. | |
| 8,826,135 B1 | 9/2014 | Anderson et al. | |
| 9,294,537 B1 | 3/2016 | Zuccarino et al. | |
| 9,420,319 B1 | 8/2016 | Hwang et al. | |
| 2005/0038819 A1 | 2/2005 | Hicken et al. | |
| 2005/0283497 A1 | 12/2005 | Nurminen et al. | |
| 2008/0004959 A1 | 1/2008 | Tunguz-Zawislak et al. | |
| 2008/0052371 A1 | 2/2008 | Partovi et al. | |
| 2008/0189395 A1 | 8/2008 | Stremel et al. | |
| 2008/0294607 A1 | 11/2008 | Partovi et al. | |
| 2009/0100469 A1 | 4/2009 | Conradt et al. | |
| 2010/0094878 A1 | 4/2010 | Soroca et al. | |
| 2010/0161619 A1 | 6/2010 | Lamere et al. | |
| 2010/0235317 A1 | 9/2010 | Yu et al. | |
| 2010/0235376 A1* | 9/2010 | Sukanen ................. | G06F 16/68 707/769 |
| 2010/0306249 A1 | 12/2010 | Hill et al. | |
| 2011/0040657 A1 | 2/2011 | Roswell et al. | |
| 2011/0282749 A1 | 11/2011 | Pradeep et al. | |
| 2012/0096011 A1* | 4/2012 | Kay ....................... | G06F 16/635 707/748 |
| 2012/0158531 A1 | 6/2012 | Dion et al. | |
| 2012/0179693 A1 | 7/2012 | Knight et al. | |

(Continued)

OTHER PUBLICATIONS

U.S. Appl. No. 14/217,333, filed Mar. 17, 2014, Allowed.

*Primary Examiner* — Kaylee J Huang
(74) *Attorney, Agent, or Firm* — Brake Hughes Bellermann LLP

(57) ABSTRACT

A system, method, and computer-readable medium for identifying music-related data based on message data from a messaging platform. The method includes: obtaining a request from a client; identifying context data associated with the request; identifying message data from the messaging platform based on the context data; selecting, based on the context data and the message data from the messaging platform, music-related data for inclusion in a result set; and providing the result set to the client in response to the request.

20 Claims, 13 Drawing Sheets

(56) References Cited

U.S. PATENT DOCUMENTS

| | | |
|---|---|---|
| 2012/0215708 A1 | 8/2012 | Polk et al. |
| 2012/0323938 A1 | 12/2012 | Skeen et al. |
| 2013/0031177 A1 | 1/2013 | Willis et al. |
| 2013/0073362 A1 | 3/2013 | Panzironi et al. |
| 2013/0073632 A1 | 3/2013 | Fedorov et al. |
| 2013/0073983 A1 | 3/2013 | Rasmussen et al. |
| 2013/0096981 A1 | 4/2013 | Evans et al. |
| 2013/0227011 A1 | 8/2013 | Sharma et al. |
| 2013/0238444 A1 | 9/2013 | Munaco et al. |
| 2013/0297467 A1 | 11/2013 | Kidron et al. |
| 2013/0339434 A1 | 12/2013 | Nogues et al. |
| 2014/0074269 A1* | 3/2014 | Weston .............. G06Q 30/0282 700/94 |
| 2014/0075313 A1 | 3/2014 | Bachman et al. |
| 2014/0223099 A1 | 8/2014 | Kidron et al. |
| 2014/0297749 A1 | 10/2014 | Jayaram et al. |
| 2015/0242893 A1 | 8/2015 | Sultania et al. |
| 2015/0372952 A1* | 12/2015 | Lefar .................... H04L 51/10 709/206 |

\* cited by examiner

MUSIC DISCOVERY USING MESSAGES OF A MESSAGING PLATFORM

CROSS-REFERENCE TO RELATED APPLICATIONS

This application is a continuation of, and claims priority to, U.S. Nonprovisional patent application Ser. No. 14/217,333, filed on Mar. 17, 2014, entitled "MUSIC DISCOVERY USING MESSAGES OF A MESSAGING PLATFORM", which claims priority to U.S. Provisional Patent Application No. 61/800,371, filed on Mar. 15, 2013, the disclosures of both of which are incorporated by reference herein in their entirety.

BACKGROUND

As technology advances in the areas of social networking and collaboration, sharing multimedia content has become easier than ever before. For example, social networks have made it possible for artists to connect with their fans and to promote their work directly to interested users. Users can then share this content, in addition to relevant personal interests (e.g., musical preferences), with other users. Even further, users can connect with other users with similar interests (i.e., by engaging with similar content online). Using ever more ubiquitous mobile devices, users can share their experiences and engage with other users in real-time.

With the advent of low-cost recording and production technologies, music production has also been revolutionized. Artists can produce, share, and promote their music from the comfort of their own homes, and for a fraction of the price of traditional music production. Record labels and studios have also benefited. With viral/social marketing campaigns, music can be promoted far more easily and with far more relevant advertising than television or print media.

SUMMARY

In general, in one aspect, the invention relates to a method for identifying music-related data based on message data from a messaging platform. The method includes: obtaining a request from a client; identifying context data associated with the request; identifying message data from the messaging platform based on the context data; selecting, based on the context data and the message data from the messaging platform, music-related data for inclusion in a result set; and providing the result set to the client in response to the request.

In general, in one aspect, the invention relates to a method for aggregating music citations. The method includes: identifying a set of websites associated with music; identifying a set of templates, each defining a text structure of a music citation; using the set of templates to extract music citations from the set of websites; presenting the music citations to a human editor for approval; receiving approval from the human editor for at least a portion of the music citations; and storing an aggregate list including songs identified by at least the portion of the music citations in a storage repository, where the aggregate list is used to provide music recommendations to a client.

In general, in one aspect, the invention relates to a system for identifying music-related data based on message data from a messaging platform. The system includes a computer processor and a music runtime engine executing on the computer processor and configured to: obtain a request from a client; identify context data associated with the request; identify message data from the messaging platform based on the context data; select, based on the context data and the message data from the messaging platform, music-related data for inclusion in a result set; and provide the result set to the client in response to the request.

In general, in one aspect, the invention relates to a system for aggregating music citations. The system includes: a computer processor; a music aggregation module executing on the computer processor and configured to: identify a set of websites associated with music, identify a set of templates, each defining a text structure of a music citation, use the set of templates to extract music citations from the set of web sites, present the music citations to a human editor for approval, receive approval from the human editor for at least a portion of the music citations, and store an aggregate list including songs identified by at least the portion of the music citations in a storage repository; and a music runtime engine configured to: receive a request for music recommendations, and provide least a subset of the aggregate list to a client in response to the request.

In general, in one aspect, the invention relates to a non-transitory computer-readable storage medium including instructions for identifying music-related data based on message data from a messaging platform. The instructions, when executed by at least one computer processor, enable the computer processor to: obtain a request from a client; identifying context data associated with the request; identify message data from the messaging platform based on the context data; select, based on the context data and the message data from the messaging platform, music-related data for inclusion in a result set; and provide the result set to the client in response to the request.

In general, in one aspect, the invention relates to a non-transitory computer-readable storage medium including instructions for aggregating music citations. The instructions, when executed by at least one computer processor, enable the computer processor to: identify a set of websites associated with music; identify a set of templates, each defining a text structure of a music citation; use the set of templates to extract music citations from the set of websites; present the music citations to a human editor for approval; receive approval from the human editor for at least a portion of the music citations; and store an aggregate list including songs identified by at least the portion of the music citations in a storage repository, where the aggregate list is used to provide music recommendations to a client. Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
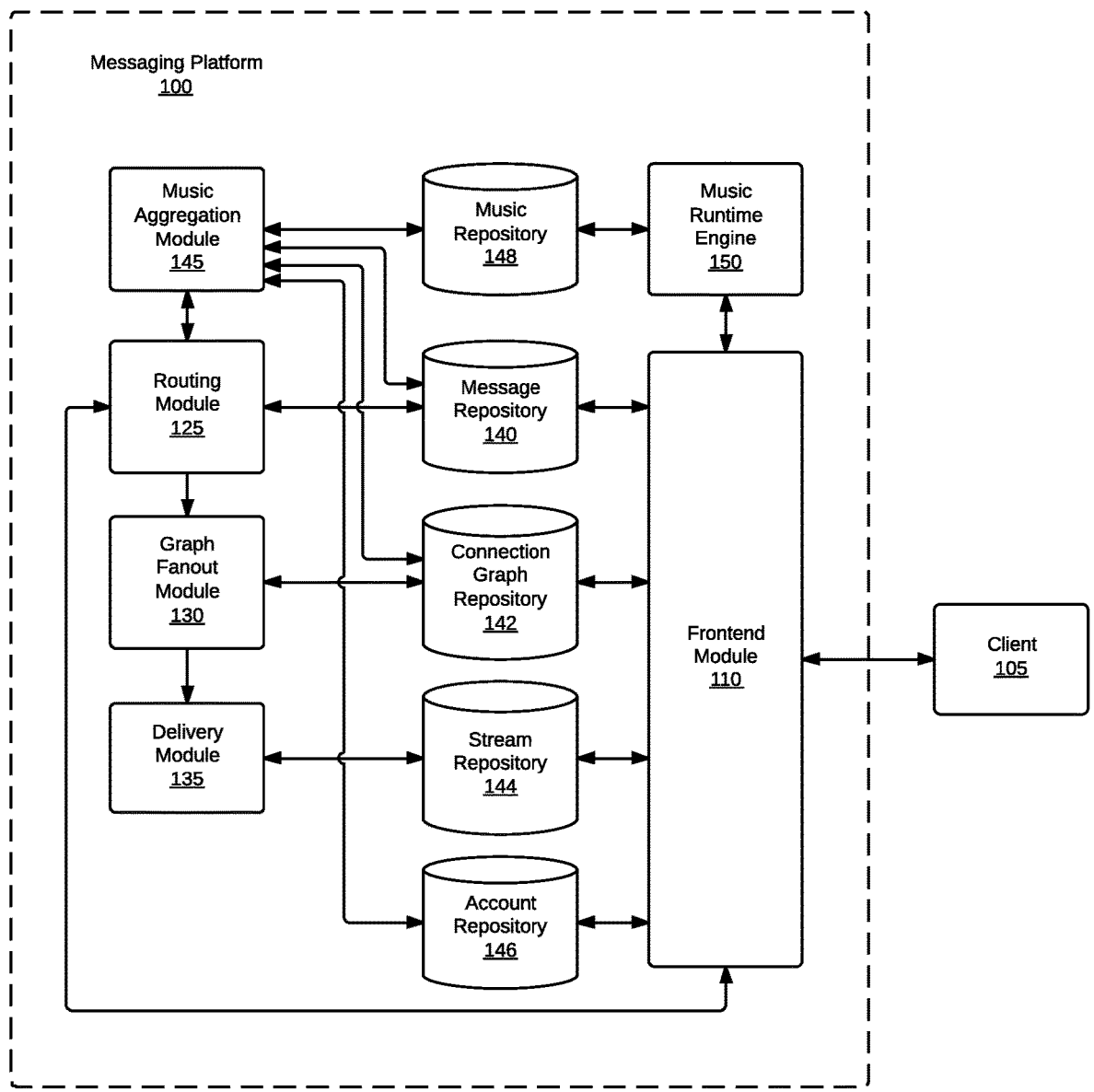
FIG. 1 shows a schematic diagram of a system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for identifying music-related data based on message data from a messaging platform. A music request is received from a client. The request can include, for example, associated context data. Data from the messaging platform can then be identified and used, in conjunction with the associated context data, to identify one or more accounts of the messaging platform. A result set including the identified accounts is provided to the client in response to the music request.

In general, embodiments of the invention provide a user interface for presenting music-related content to one or more users, based on message data of a messaging platform. The user interface can present the message-related content based on popularity, popularity trend(s), relationship data from a connection graph, interest data associated with a user account, and/or any number of other information obtained from the messaging platform.

FIG. 1 shows a messaging platform (100) and a client (105) in accordance with one or more embodiments of the invention. As shown in FIG. 1, the messaging platform (100) has multiple components including a music runtime engine (150), a music aggregation module (145), a music repository (148), a frontend module (110), a routing module (125), a graph fanout module (130), a delivery module (135), a message repository (140), a connection graph repository (142), a stream repository (144), and an account repository (146). Various components of the messaging platform (100) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

In one or more embodiments of the invention, the messaging platform (100) is a platform for facilitating real-time communication between one or more entities. For example, the messaging platform (100) may store millions of accounts of individuals, businesses, and/or other entities (e.g., pseudonym accounts, novelty accounts, etc.). One or more users of each account may use the messaging platform (100) to send messages to other accounts inside and/or outside of the messaging platform (100). In one or more embodiments, a message is a content container. Messages can include text, video, audio, photos, and/or other types of content, in accordance with various embodiments. The messaging platform (100) may be configured to enable users to communicate in "real-time", i.e., to converse with other users with a minimal delay and to conduct a conversation with one or more other users during simultaneous sessions. In other words, the messaging platform (100) may allow a user to broadcast messages and may display the messages to one or more other users within a reasonable time frame so as to facilitate a live conversation between the users. Recipients of a message may have a predefined graph relationship with an account of the user broadcasting the message. In one or more embodiments of the invention, the user is not an account holder or is not logged in to an account of the messaging platform (100). In this case, the messaging platform (100) may be configured to allow the user to broadcast messages and/or to utilize other functionality of the messaging platform 100 by associating the user with a temporary account or identifier.

For purposes of this disclosure, a music citation can be any citation of an artist, song, album, recording date, and/or other information related to music content. The following are examples of music citations in various different formats:

Swedish House Mafia ("Don't You Worry Child")
Bruno Mars—Locked Out of Heaven
"Requiem For The Indifferent" by Epica
David Guetta—She wolf ft Sia In one or more embodiments of the invention, the music aggregation module (145) includes functionality to identify a set of websites associated with music. The websites can be obtained from a predefined list or can be identified programmatically using a crawler. Examples of websites associated with music can include, but are not limited to, a billboard music website, a music review blog, an emerging artist's web page, a music studio website, a streaming music website, a digital media store, and/or any other website associated with music.

In one or more embodiments of the invention, the music aggregation module (145) includes functionality to use one or more templates to extract music citations from one or more of the websites associated with music. A template can be any sequence, format, or specific string of text usable in identifying one or more music citations (e.g., according to the chosen method of linguistic matching). For example, a template can be defined to identify a commonly used music citation format (e.g., "[Artist]-[Song]"). Any text matching algorithm can be used to identify the music citations, in accordance with various embodiments of the invention. For example, the music aggregation module (145) can be configured to use an n-gram text matching algorithm to identify music citations. The music citations can include, for example, songs by one or more artists. In one or more embodiments, the music aggregation module (145) is configured to identify a ranking of one or more music citations on the website and to associate the ranking with the music citation in the music repository (148).

In one or more embodiments of the invention, the music aggregation module (145) includes functionality to present the music citations extracted from one or more websites to a human editor for approval and/or modification. The music aggregation module (145) can be configured to receive corrections and/or other modifications to the music citations from the human editor. The human editor may add, remove, and/or modify one or more music citations using a user interface (not shown) of the music aggregation module (145).

In one or more embodiments of the invention, the music aggregation module (145) includes functionality to store an aggregate song list and/or an aggregate artist list in the music repository (148).

In one or more embodiments of the invention, the music aggregation module (145) includes functionality to define one or more templates for identifying messages including music-related content. For example, a template can be defined to identify music citations in one or more messages based on a commonly used hashtag or other keyword (e.g., "#NP", "nowplaying", etc.). In another example, a template can be defined to identify a commonly used music citation format among messages of the messaging platform (100) (e.g., "[Artist]-[Song]").

In one or more embodiments of the invention, the music aggregation module (145) includes functionality to identify a set of messages posted to the messaging platform (100) that include music-related content. Examples of music-related content can include, but are not limited to, a message including a uniform resource locator (URL) of a song hosted by a third-party website, a URL of an artist account of the messaging platform (100), a music citation including a song (e.g., "Lana Del Ray—American"), a message including a comment/review of a song/album/comment of an artist account, a message including a positive/neutral/negative sentiment towards music content, and/or any other content directly or indirectly associated with music. The music aggregation module (145) can be configured to identify music-related content by using any method of linguistic matching, in accordance with various embodiments of the invention. The music aggregation module (145) can be configured to use one or more templates for identifying messages including music-related data. For example, the music aggregation module (145) can be configured to use an n-gram text matching algorithm to identify messages including music-related content. In one or more embodiments, the music aggregation module (145) can be configured to identify the messages including the music-related content in the message repository (140). Alternatively, in one or more embodiments, the music aggregation module (145) can be configured to analyze messages for music-related content as they are ingested by the routing module (125) and to annotate the messages with metadata attributes prior to the messages being stored in the message repository (140).

In one or more embodiments of the invention, the music aggregation module (145) includes functionality to match the identified music citations to the aggregate song list and/or the aggregate artist list. The music aggregation module (145) can be configured to compare one or more songs identified within messages to songs in the aggregate song list. A counter can be maintained for each song in the aggregate song list indicating a number of messages referencing the song within one or more predefined time periods. A counter can also be maintained for each artist in the aggregate artist list indicating a number of messages referencing the artist within one or more predefined time periods. Other attributes of the messages can also be associated with the relevant songs and/or artists in the music repository (148). The music aggregation module (145) can perform a periodic (e.g., daily) analysis of messages posted to the messaging platform (100) or can be configured to perform the analysis on demand as messages are ingested for posting to the messaging platform (100).

In one or more embodiments of the invention, the music aggregation module (145) includes functionality to calculate scores for one or more songs from the aggregate song list based on messages of the messaging platform (100). For example, each score can be calculated based on messages containing music citations referencing a given song in the aggregate song list. The music aggregation module (145) can be configured to score the songs according to a predefined scoring algorithm. The scoring algorithm can require scoring of each unique song based on any number of criteria. Criteria for scoring a song can include, but are not limited to, number of references from messages of the messaging platform (e.g., within a predefined time period), relative (e.g., %) increase in references from messages of the messaging platform within a predefined time period, average engagement with messages referencing the song within a predefined time period, average number of plays per predefined time period (e.g., day, hour, minute), average number of messages referencing the song and including a positive sentiment, and any other input usable in ranking a song. For example, the following scoring algorithm, or a variant thereof, can be used to calculate one or more scores: Score=P*T, where P equals the total number of plays of the song over the past week, and where T equals the trend coefficient of the song. In this example, the trend coefficient is a percentage rate of change in number of plays of the song within the last hour. Subsequent to scoring the songs, the music aggregation module (145) can be configured to order the songs by their corresponding scores in order to generate a ranked list of songs.

In one or more embodiments of the invention, the music aggregation module (145) includes functionality to select the highest scoring songs for inclusion in a ranked list of songs. For example, depending on the scoring criteria used, one or more trending music citations can be included in a top 100 popular music list. Other attributes of the songs and/or artists can be used to generate the ranked list. For example, the music aggregation module (145) can be configured to create multiple lists, each corresponding to a musical genre or other attribute (e.g., "top 10 rock songs").

In one or more embodiments of the invention, the music aggregation module (145) is configured to include only one song per artist in each ranked list, in order to prevent a single artist from monopolizing the list. Furthermore, in one or more embodiments of the invention, songs that were release prior to a predefined time window (e.g., 1 year) are excluded from the ranked list, regardless of their popularity or score.

Similarly, in one or more embodiments of the invention, the music aggregation module (145) includes functionality to select artist accounts for inclusion in a ranked list of artists. The ranked lists of artists and/or songs can be modified by the music aggregation module (145) based on a credibility rating of the corresponding artist account, an engagement rating of messages of the artist account, a number of followers of the artist account, and/or any other criteria, in accordance with various embodiments.

In one or more embodiments of the invention, the music aggregation module (145) includes functionality to generate one or more top emerging lists. Examples of the top emerging list can include a top emerging songs list and a top emerging artists list. The music aggregation module (145) can be configured to generate one or more top emerging lists by excluding songs and/or artists identified in an aggregate song list and/or aggregate artist list. Thus, for example, the music aggregation module (145) can be configured to generate a ranked list of songs based on each song's popularity. The music aggregation module (145) can then remove songs identified in music citations of a billboard top 100 list of songs, a digital media store, or any website identifying mainstream or popular music. In this way, popular music that is not yet identified by mainstream sources can be identified in the emerging songs list. In one or more embodiments of the invention, the music aggregation module (145) includes functionality to exclude songs and/or artists associated with an artist account that has a number of connections in the connection graph which exceed a predefined number. For example, the music aggregation module (145) can be configured to exclude songs from artists having greater than 50,000 followers of their artist account in the messaging platform (100). Similarly, the emerging artists list can be generated by excluding artists cited in mainstream websites and/or having greater than a predefined number of connections.

In one or more embodiments of the invention, the music aggregation module (145) includes functionality to store one or more ranked lists in the music repository (148). The ranked lists can be periodically or asynchronously updated by a background process of the music aggregation module (145), in accordance with various embodiments of the invention. In one or more embodiments of the invention, the music runtime engine (150) includes functionality to obtain a request for account recommendations from one or more clients (e.g., client (105)). The request can be for any type of music-related accounts. For example, the music runtime engine (150) can be configured to request a ranked list of top popular soul artist accounts, top emerging rap artist accounts, top emerging jazz artist accounts, etc.

In one or more embodiments of the invention, the music runtime engine (150) includes functionality to identify context data associated with the request. Examples of context data can include, but are not limited to, an identifier of an originating account/message/website of a request (e.g., a request for account recommendations), an identifier of an originating application or hardware device of a request, an identifier of one or more recently played songs of an originating account or connected accounts having a graph relationship with the originating account, a type of request (e.g., top rock, emerging reggae, trending rap, etc.), and/or any other context sensitive data usable in identifying music-related content.

In one or more embodiments of the invention, the music runtime engine (150) includes functionality to select, based on the context data and data from the messaging platform (100), a set of accounts of the messaging platform (100) for inclusion in a result set. For example, the music runtime engine (150) can be configured to identify accounts by matching an originating account of a user to one or more artist accounts in a ranked list of artists. In this example, the music runtime engine (150) is configured to use a request type of the request (e.g., trending country music) to identify a relevant ranked list of artists (e.g., top trending country artists) and to select the set of accounts from the ranked list. The music runtime engine (150) can also be configured to perform a dynamic ranking of the artists in the ranked list based on the provided context data. Thus, for example, the rankings in the ranked list can be modified based on one or more interests, topics, keywords, and/or attributes of the user account provided as context data. Thus, if a user account has graph relationships with primarily female artists, the scores of female artists in the ranked list can be boosted by a predefined amount. In another example, demographic information of a user provided as context data can be matched to demographic information of the artist accounts in order to modify the scores and rankings in the ranked list. In one or more embodiments, although the ranked list is not modified, the rankings can be dynamically modified by the music runtime engine (150) for a particular request.

Figure 2:
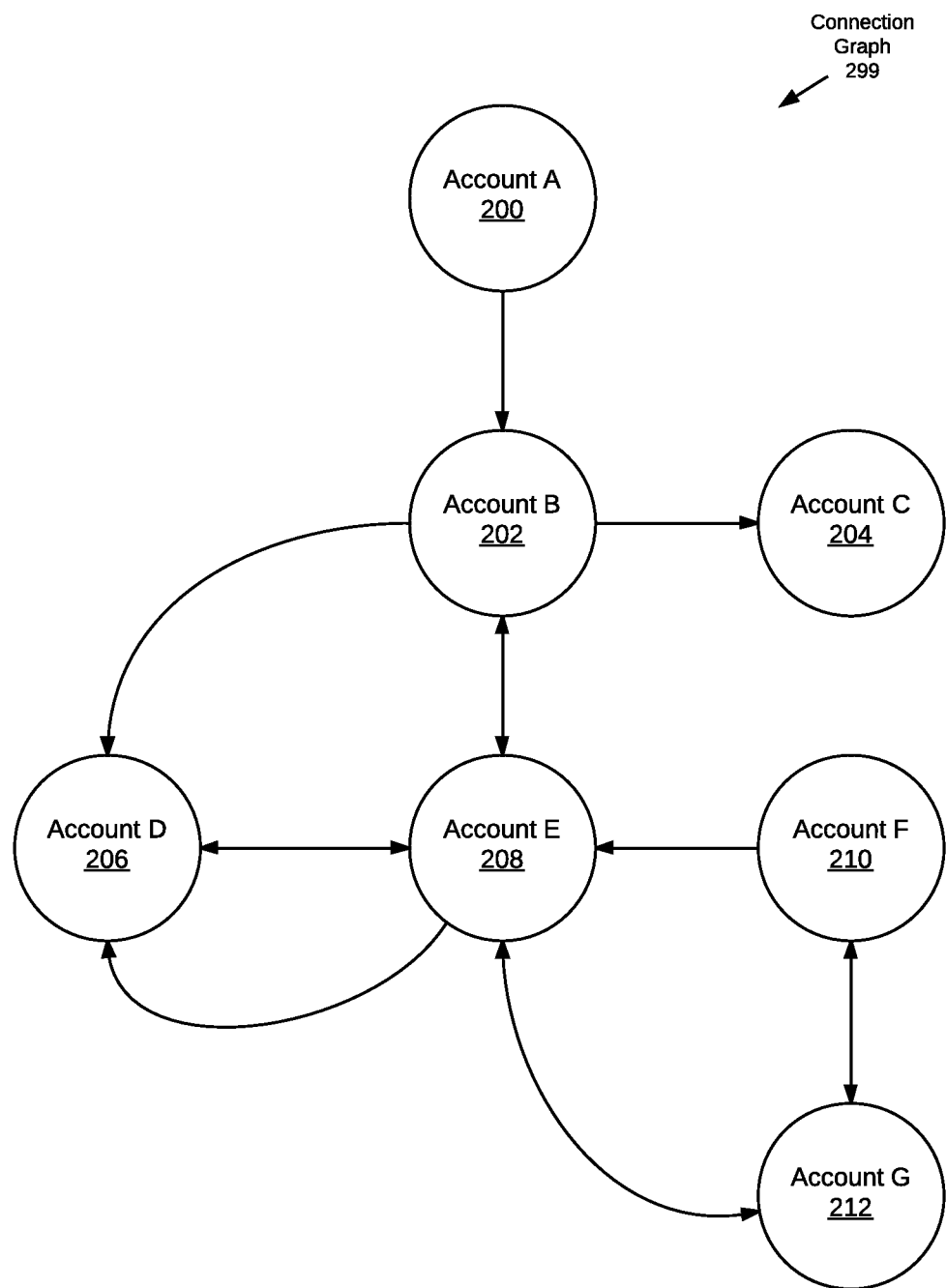
FIG. 2 shows an example depiction of a connection graph, in accordance with one or more embodiments of the invention.

In one or more embodiments of the invention, the connection graph repository (142) is configured to store one or more connection graphs. FIG. 2 shows an example depiction of a connection graph (299) in accordance with one or more embodiments of the invention. As shown in FIG. 2, the connection graph (299) has multiple components including nodes representing accounts of the messaging platform (100) (i.e., Account A (200), Account B (202), Account C (204), Account D (206), Account E (208), Account F (210), Account G (212)) and edges connecting the various nodes.

The connection graph (299) is a data structure representing relationships (i.e., connections) between one or more accounts. The connection graph (299) represents accounts as nodes and relationships as edges connecting one or more nodes. A relationship may refer to any association between the accounts (e.g., following, friending, subscribing, tracking, liking, tagging, and/or etc.). The edges of the connection graph (299) may be directed and/or undirected based on the type of relationship, in accordance with various embodiments of the invention.

In one or more embodiments of the invention, the music runtime engine (150) includes functionality to identify a set of artist accounts of the messaging platform (100) having a graph relationship with the context account. In one example, the context account is an account of a user making the request. In another example, the context account is an account or authoring account of a message from which a link was selected resulting in the request. The set of artist accounts can be accounts having any type of direct or indirect graph connection to the context account. For example, the set of artist accounts can be accounts followed by the context account, accounts subscribed to by the context account, accounts friends with the context account, accounts liked by the context account, and/or accounts having any other type of connection with the context account. In one or more embodiments of the invention, the music runtime engine (150) includes functionality to identify a ranked list of songs, each associated with an artist account of the messaging platform (100).

In one or more embodiments of the invention, the music runtime engine (150) includes functionality to identify, for each of the associated artist accounts, a bucket of related artist accounts of the messaging platform (100). For purposes of this analysis, each bucket can also include the associated artist account. Thus, for example, the music runtime engine (150) can be configured to fetch 20 related artist accounts similar to an associated account and to construct a bucket to store identifiers of the 20 related artist accounts and the associated account. The related artist accounts can be identified based on attribute matching and/or relevance analysis performed on the associated account and a corpus of artist accounts (in order to identify similar accounts).

In one or more embodiments of the invention, the music runtime engine (150) includes functionality to calculate, for each of the buckets, a score depicting a relevance of the artist accounts of the bucket to the set of artist accounts having the graph relationship with the context account. For example, a Jaccard index can be calculated for the two sets of accounts (i.e., the artist accounts of the bucket and the artist accounts having the graph relationship) using the following formula, or a variant thereof:

Score=$|A \cap B|/|A \cup B|$, where A is the set of artist accounts identified by the bucket, and where B is the set of artist accounts having the graph relationship.

In one or more embodiments of the invention, the music runtime engine (150) includes functionality to select, for each of at least a subset of the buckets, a number of the related accounts proportional to the score of the bucket. Thus, for example, if a first bucket has a score of 1.2, and a second bucket has a score of 2.4, twice as many accounts are selected from the second bucket. The total number of selected accounts can be any predefined number. The music runtime engine (150) can be configured to perform the selection of the accounts of each bucket randomly, or according to a predefined selection algorithm. The music runtime engine (150) can be configured to include the selected accounts in a result set. In one example, five buckets represented by the characters A, B, C, D, and E are scored as follows: A=2, B=4, C=8, D=4, and E=2. Each bucket includes identifiers of 10 artist accounts. In this example, 10 artist accounts are to be selected from the various buckets. First, the music runtime engine (150) calculates a total of all the scores as 2+4+8+4+2=20. Next, the music runtime engine (150) calculates a number of accounts to be selected from a given bucket X as follows: Nx=(Sx/B)*R, where Nx is the number of accounts to be selected for bucket X, where Sx is the score of the bucket, where B is a summation of all bucket scores, and where R is the number of requested accounts. Thus, the number of accounts selected from each of the buckets in the current example are as follows:

$Na=(2/20)*10=1$ $Nb=(4/20)*10=2$ $Nc=(8/20)*10=4$ $Nd=(4/20)*10=2$ $Ne=(2/20)*10=1$

In one or more embodiments of the invention, the music runtime engine (150) includes functionality to select the artist accounts from each bucket randomly and to include the selected artist accounts in a result set. In one or more embodiments of the invention, the music runtime engine (150) can be configured to add a promoted artist account to the result set. The music runtime engine (150) can then be configured to provide the result set to the client in response to the request. The promoted artist account can then be displayed by the client (105) with an indication that the account is promoted. In one or more embodiments of the invention, the messaging platform (100) includes functionality to provide self-service advertising to one or more artists by way of a user interface accessible via their artist account. The messaging platform (100) can receive a request to promote the artist account or a song by the artist in exchange for payment. The messaging platform can then insert the promoted account or the promoted song in one or more result sets sent to clients for display to users.

In one or more embodiments of the invention, the music runtime engine (150) includes functionality to obtain a song request from a client. The song request can include or be associated with any amount of context data.

In one or more embodiments of the invention, the music runtime engine (150) includes functionality to select a set of songs for inclusion in a result set. In one or more embodiments, the songs are selected from a ranked list of songs and can be pruned or re-ranked based on context data associated with the request. For example, songs identified on billboard websites can be removed for an emerging song request. The music runtime engine (150) can be configured to calculate a score for each song based on context data (e.g., musical genres, preferences, followed accounts of a user account, etc.) as well as aggregate data from the messaging platform (100). For example, the music runtime engine (150) can be configured to increase the scores of trending, popular (e.g., high number of plays, shares, comments), and/or highly rated songs. Furthermore, in another example, the music runtime engine (150) can be configured to decrease the scores of songs posted primarily by spam accounts, unpopular songs, and/or lowly rated songs. After scoring the songs, the music runtime engine (150) is configured to select a predefined number of the highest scored songs for inclusion in a result set. In one or more embodiments of the invention, the music runtime engine (150) includes functionality to insert one or more promoted songs into the result set (e.g., at a top of a list of songs). The client (105) can then display the promoted songs with an indication that they are promoted by an artist account.

In one or more embodiments of the invention, the music aggregation module (145) includes functionality to calculate and/or obtain an engagement value associated with a set of messages. The messages can correspond to a particular song or artist in a ranked list, for example. An engagement value is any representation of user engagement with one or more messages posted to the messaging platform (100). Examples of an engagement value can include, but are not limited to, an average number of message rebroadcasts, an average number of favorites, an average number of likes, and an average number of replies, an average number of views, an average number of clicks, and any other measure of engagement with a message.

In one or more embodiments of the invention, the music aggregation module (145) includes functionality to modify or calculate the score of a song or artist based on the engagement value. The engagement value can first be compared with a threshold value (e.g., an expected value). Based on this comparison, the music runtime engine (150) can be configured to modify the score of the message/artist. For example, the engagement value can be included as an input to the scoring algorithm in order to weight the score positively based on higher than expected engagement or to weight the score negatively based on lower than expected engagement. In one or more embodiments, the engagement value is only included as an input to the scoring function if the minimum/maximum threshold value is surpassed.

In one or more embodiments of the invention, the music runtime engine (150) includes functionality to provide the result set to the client in response to the request. Examples of the client can include a mobile application executing on a mobile device, a web browser executing on a laptop computer, a web server hosting content to one or more users, and/or any other software application executing on one or more hardware devices.

In one or more embodiments of the invention, the client (105) includes functionality to display a user interface associated with a selected artist account. For example, the client (105) can be configured to display a profile page of an artist account concurrently with one or more accounts having a graph relationship with the artist account (e.g., accounts followed by the artist).

Figure 7:
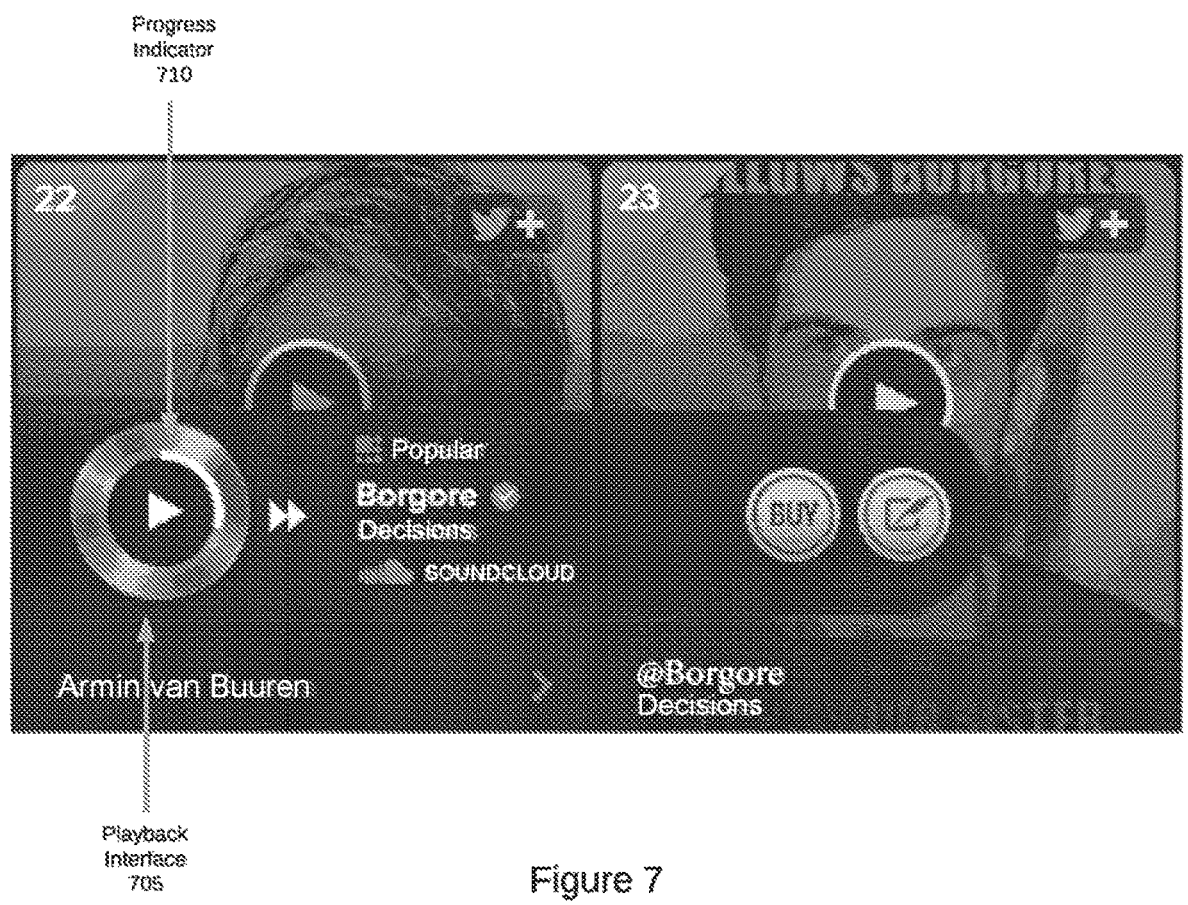
FIGS. 7, 8, 9, and 10 show example user interfaces, in accordance with one or more embodiments of the invention.

In one or more embodiments of the invention, the client (105) includes functionality to display a user interface for audio and/or video playback (i.e., a play) of music-related content. FIG. 7 depicts an example of a user interface for audio and video playback. In the example of FIG. 7, a client application displays an audio control widget (playback interface 705) overlaid onto a web page displaying multiple songs. The audio control widget includes a circular progress indicator (710). The circular progress indicator (710) can include a circular progress bar wrapped around a play button and initially (before initiating playback) displayed as a solid color. The circular progress bar then populates with a second color in proportion to the amount of the song which has currently been played. The circular progress bar can be populated in discrete chunks of varying size, in accordance with various embodiments of the invention.

Figure 8:
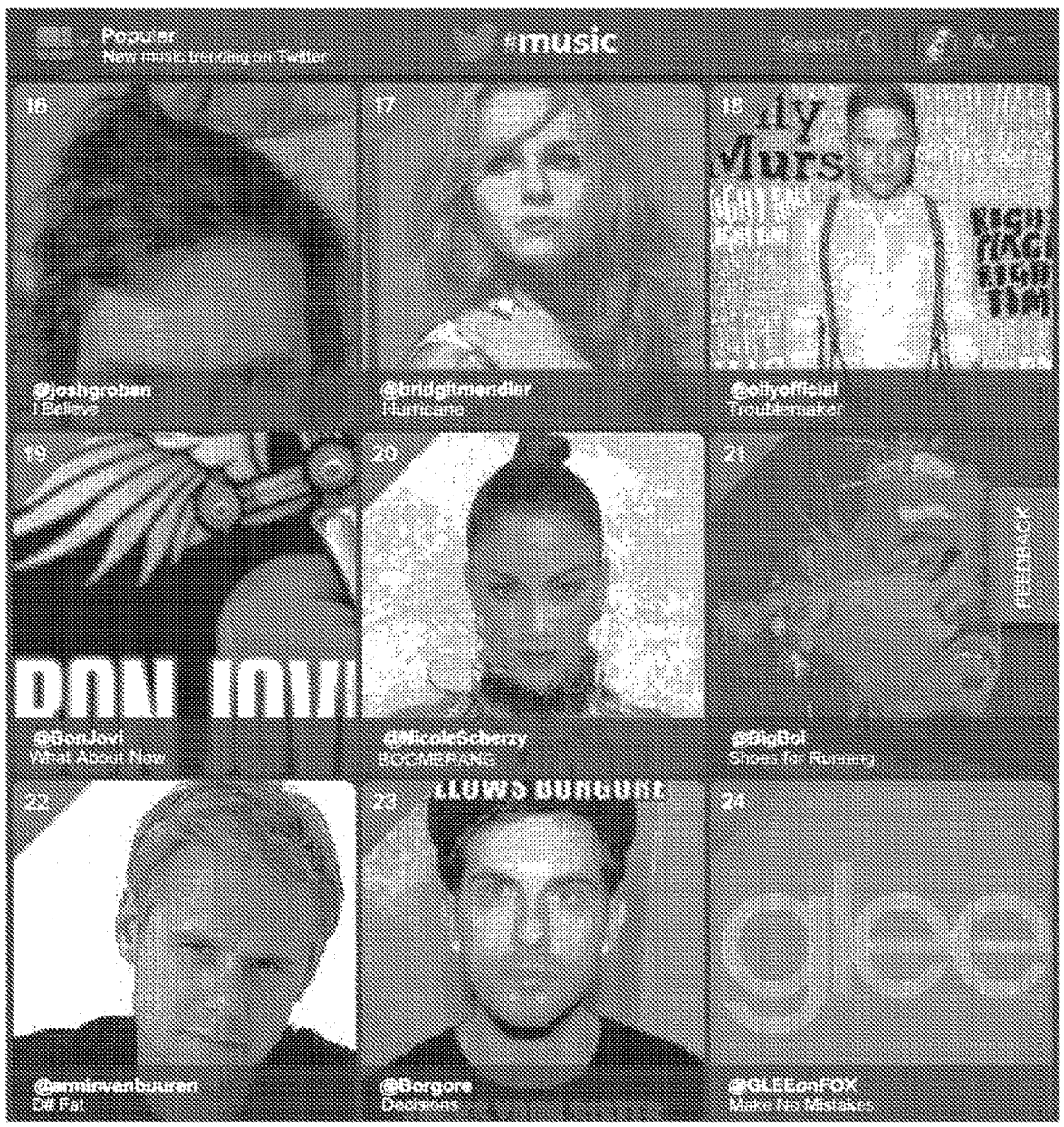
Figure 9:
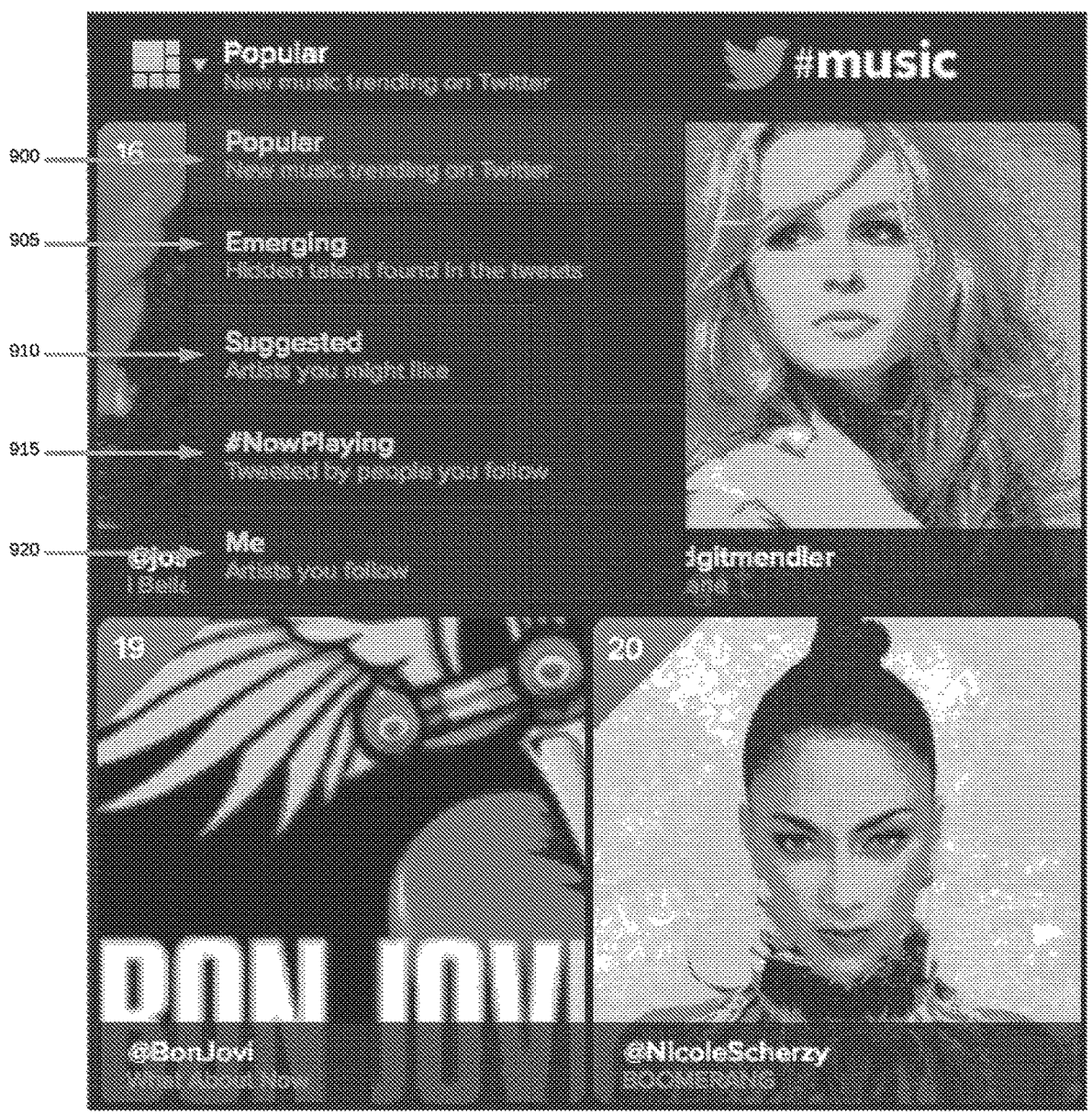

In one or more embodiments of the invention, the client (105) includes functionality to display a user interface (UI) including a grid of UI elements, each corresponding to a song. FIG. 8 shows an example of a UI including such a grid. The client (105) can be configured to select songs for inclusion in the grid according to a request type (e.g., popular, emerging, suggested, #NowPlaying, etc.) selected by a user. FIG. 9 shows an example of a user interface including a menu of selectable UI elements (900-920). In the example, of FIG. 9, UI element 900 is a selectable button corresponding to a request for top popular songs, UI element 905 is a selectable button corresponding to a request for top emerging songs, UI element 910 is a selectable button corresponding to a request for songs selected based on a user account of the user of the UI, and UI element 915 is a selectable button corresponding to a request for songs which are referenced by messages posted to a timeline of the requesting user account within the last hour.

Figure 10:
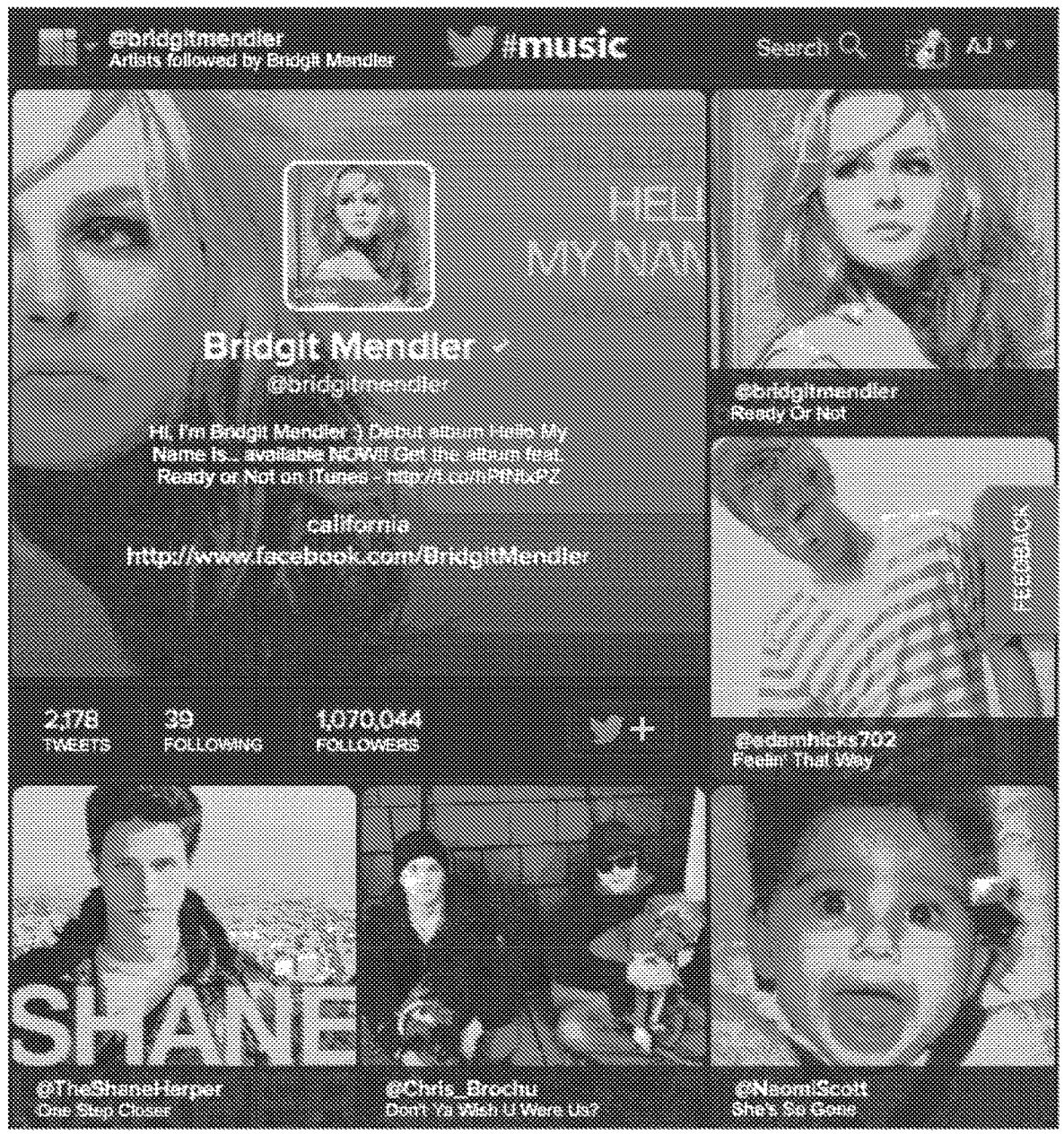

In one or more embodiments of the invention, the client (105) includes functionality to display a music profile page corresponding to an artist account of the messaging platform (100). The music profile page can include a grid of UI components. A large UI component associated with the artist account can be displayed at a top of the grid, while other UI components in the grid represent related artist accounts having a graph relationship with the artist account (e.g., artist accounts followed by the artist account). FIG. 10 depicts an example of such a user interface.

In one or more embodiments of the invention, the user interfaces of FIGS. 7-10 can be generated by a client application executing on the client (e.g., a mobile application on a smartphone) or can be generated by a server application (e.g., a web server) and sent to a client application (e.g., a web browser) for rendering.

In one or more embodiments of the invention, the routing module (125) includes functionality to receive one or more messages and to store the messages in the message repository (140). The routing module (125) can be configured to assign an identifier to the message and to notify the graph fanout module (130) of a sender of the message.

In one or more embodiments of the invention, the graph fanout module (130) includes functionality to retrieve graph data from the connection graph repository (142) and to use the graph data to determine which accounts in the messaging platform (100) should receive the message. The graph data, for example, can reflect which accounts in the messaging platform are "following" a particular account and are, therefore, subscribed to receive status messages from the particular account.

In one or more embodiments of the invention, the delivery module (135) includes functionality to receive a list of accounts from the graph fanout module (130) and the message identifier generated by the routing module (125) and to insert the message identifier into stream data associated with each identified account. The delivery module (135) can then store the message list in the stream repository (144). The stream data stored in the stream repository (144) can make up one or more streams associated with one or more accounts of the messaging platform (100). A stream may be a dynamic list of messages associated with one or more accounts or can reflect any arbitrary organization of messages that is advantageous for the user of an account.

In one or more embodiments of the invention, the music aggregation module (145) is a software application or a set of related software applications configured to execute on one or more hardware processors. The music aggregation module (145) can include one or more reader threads configured to perform multiple concurrent searches/analysis of messages of the messaging platform (100). The music aggregation module (145) can be a component of a service-oriented architecture (SOA) or any other software platform, either inside or outside of the messaging platform (100), in accordance with various embodiments. In one or more embodiments of the invention, one or more components of the music aggregation module (145) reside in a cloud computing application in a network distributed system. In one or more embodiments of the invention, music aggregation module (145) is integrated within or operatively connected to one or more other components of the messaging platform (100).

In one or more embodiments of the invention, the music runtime engine (150) is a software application or a set of related software applications configured to execute on one or more hardware processors. The music runtime engine (150) can include one or more reader threads configured to perform multiple concurrent searches/analysis of data in the music repository (148). The music runtime engine (150) can be a component of a service-oriented architecture (SOA) or any other software platform, either inside or outside of the messaging platform (100), in accordance with various embodiments. In one or more embodiments of the invention, one or more components of the music aggregation module (145) reside in a cloud computing application in a network distributed system. In one or more embodiments of the invention, music runtime engine (150) is integrated within or operatively connected to one or more other components of the messaging platform (100) (e.g., the music aggregation module (145)).

In one or more embodiments of the invention, the music aggregation module (145) is configured to perform query-independent functionality associated with identifying music-related content. The query-independent functionality (described herein) can be performed periodically or upon ingesting one or more messages for posting to the messaging platform (100). In one or more embodiments of the invention, the music runtime engine (150) is configured to perform query-dependent functionality associated with identifying music-related content.

In one or more embodiments of the invention, the frontend module (110) is a software application or a set of related software applications configured to communicate with external entities (e.g., client (105)). The frontend module (110) can include the application programming interface (API) and/or any number of other components used for communicating with entities outside of the messaging platform (100). The API can include any number of specifications for making requests from and/or providing data to the messaging platform (100). For example, a function provided by the API can provide artist/song recommendations to a requesting client (105).

In one or more embodiments of the invention, the frontend module (110) is configured to use one or more of the data repositories (message repository (140), connection graph repository (142), stream repository (144), account repository (146), and music repository (148)) to define streams for serving messages (i.e., stream data) to a user of the account on the messaging platform (100). A user can use any client (105) to receive the messages. For example, where the user uses a web-based client to access the messaging platform (100), an API of the frontend module (110) can be utilized to define one or more streams and/or to serve the stream data to the client for presentation to the user. Similarly, different forms of message delivery can be handled by different modules in the frontend module (110). In one or more embodiments of the invention, the user can specify particular receipt preferences which are implemented by the frontend module (110).

In one or more embodiments of the invention, one or more of the data repositories (message repository (140), connection graph repository (142), stream repository (144), account repository (146), and music repository (148)) is a database and/or storage service residing on one or more servers. For example, one or more of the data repositories may be implemented as a storage service using service-oriented architecture (SOA) and configured to receive requests for data and to provide requested data to other components of the messaging platform (100). In another example, the message repository (140) can include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application can be used, in accordance with various embodiments of the invention.

In one or more embodiments of the invention, one or more of the data repositories (message repository (140), connection graph repository (142), stream repository (144), account repository (146), and music repository (148)) is a separate application or set of applications residing on one or more servers external (and communicatively coupled) to the messaging platform (100). Alternatively, in one or more embodiments of the invention, one or more of the data repositories can be an integrated component of the messaging platform (100) and/or can reside, either partially or entirely, on one or more common hardware devices (e.g., a server).

FIGS. 3, 4A, 4B, 5, 6A, and 6B show flowcharts of methods, in accordance with various embodiments of the invention. While the various steps in these flowcharts are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIGS. 3, 4A, 4B, 5, 6A, and 6B should not be construed as limiting the scope of the invention.

Figure 3:
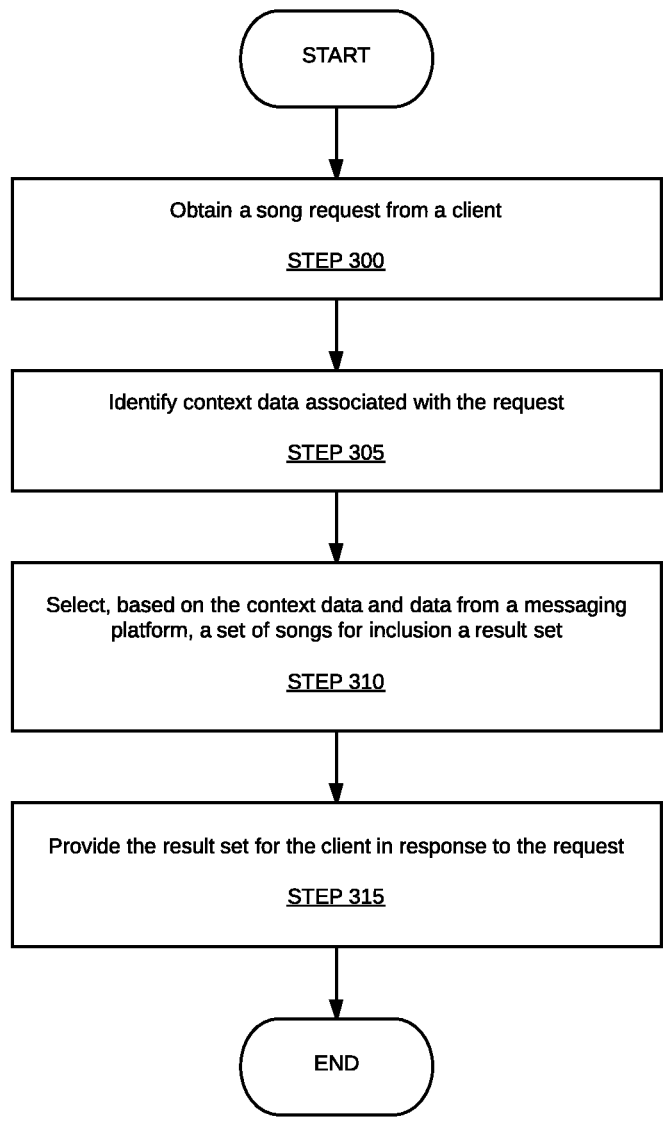
FIGS. 3, 4A, 4B, 5, 6A, and 6B show flowcharts, in accordance with one or more embodiments of the invention.

Referring to FIG. 3, in one or more embodiments, a song request is received from a client (Step 300) and context data associated with the request is identified (Step 305). The song request may include an identifier of a context account for which the content is requested. The identifier can then be used to retrieve the context data associated with the context account. The song request may be received by a component of a messaging platform (e.g., music runtime engine 150 via frontend module 110 of FIG. 1, discussed above). Based on the context data and other data of the messaging platform (e.g., messages, engagement data, music data, etc.), a set of songs is selected for inclusion in a result set (Step 310) and provided for the client (Step 315).

Figure 4A:
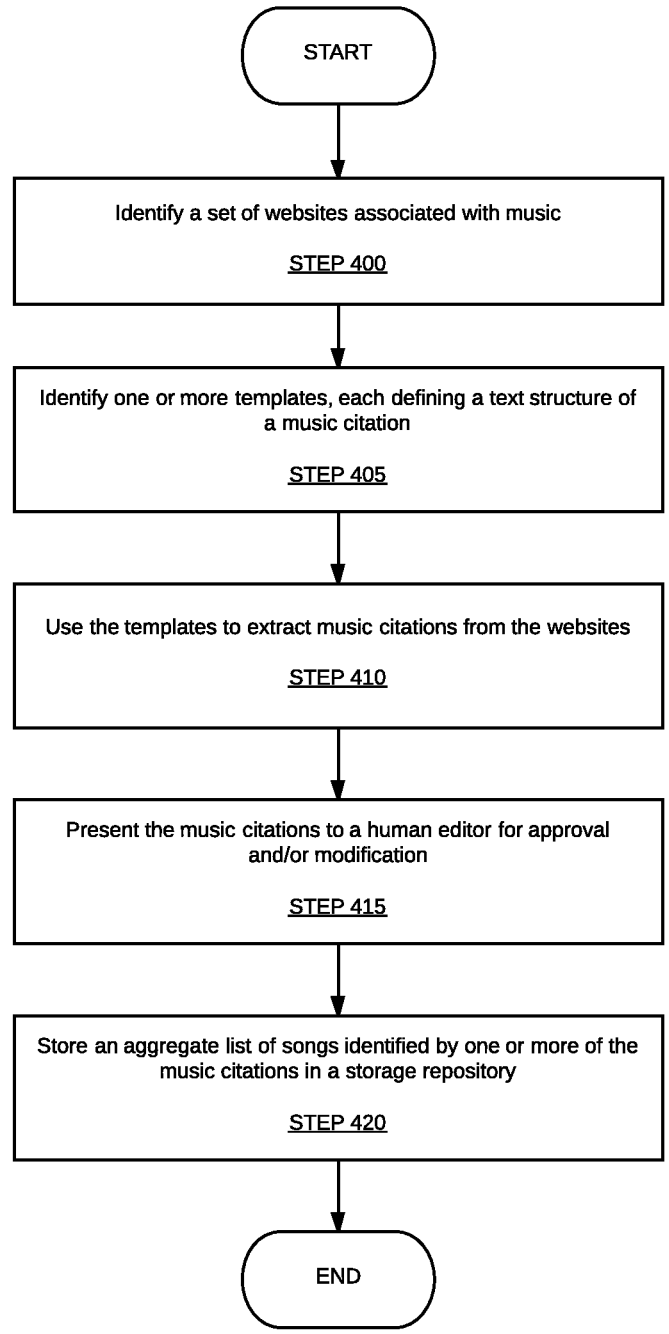

Referring to FIG. 4A, in one or more embodiments, a set of websites associated with music is identified (Step 400). One or more templates are identified (Step 405) and used to extract music citations from the websites (Step 410). Each template defines a specified structure of a music citation and multiple templates can be used to detect citations in a variety of different formats/structures from a variety of different sources. Optionally, a human editor can review and/or modify each of the identified music citations (Step 415). An aggregate list of the songs is then stored in a repository (Step 420). Any associated data, such as a source of the song's citations, a number of citations of the song, a number of references to the song, and etc. can also be stored in the repository.

Figure 4B:
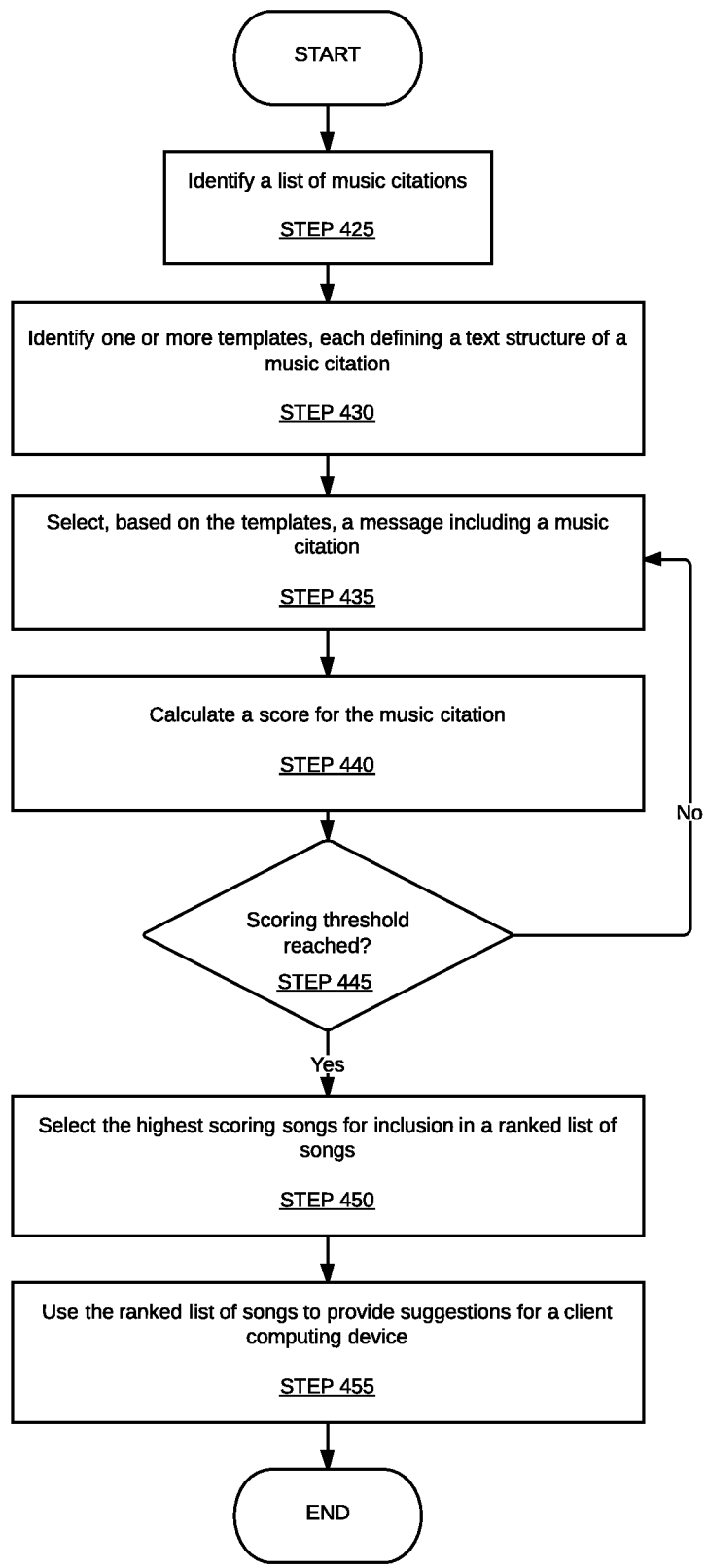

Referring to FIG. 4B, in one or more embodiments, a list of music citations is identified (Step 425) and one or more templates are identified (Step 430), each template associated with a specified citation structure/format. Using the templates, music citations within messages of the messaging platform are identified (Step 435) and scored (Step 440) until a scoring threshold is reached (Step 445). The highest scoring songs are included in a ranked list (Step 450) which is used to provide suggestions for a client device (Step 455).

Figure 5:
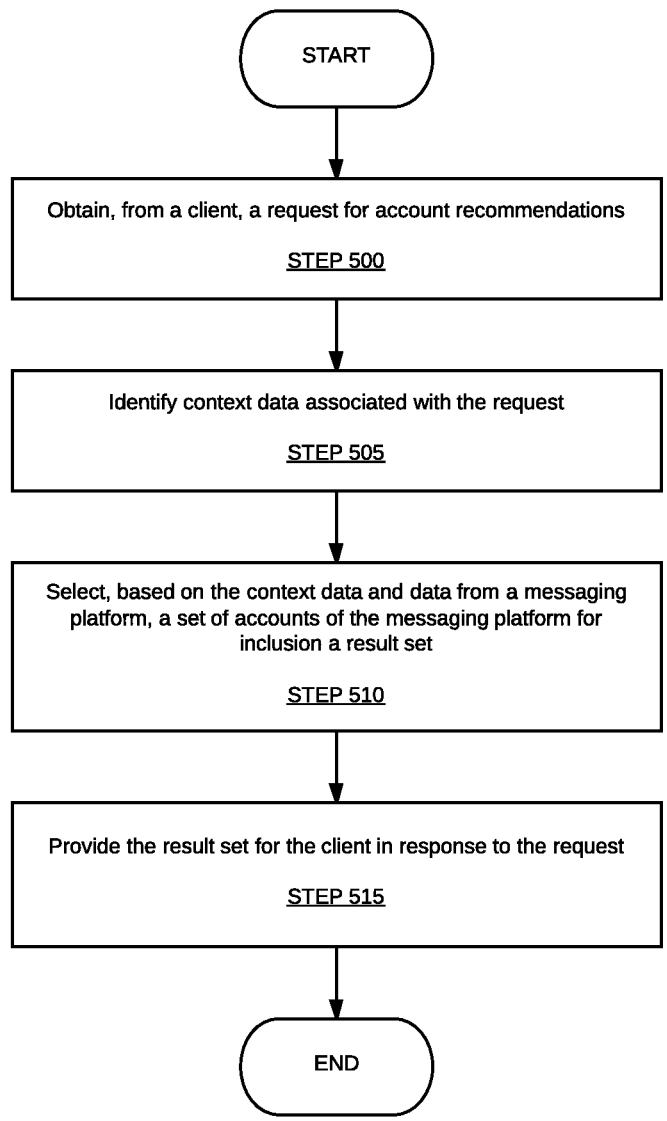

Referring to FIG. 5, in one or more embodiments, a request for account recommendations is obtained from a client (Step 500). Context data associated with the request is obtained (Step 505) and used to select accounts form the messaging platform for inclusion m a result set of accounts (Step 510). The context data can be matched to attributes of the accounts or otherwise used as a signal for identifying the accounts based on attributes or engagements of the accounts. A result set of accounts is then provided for the client in response to the request for account recommendations (Step 515).

Figure 6A:
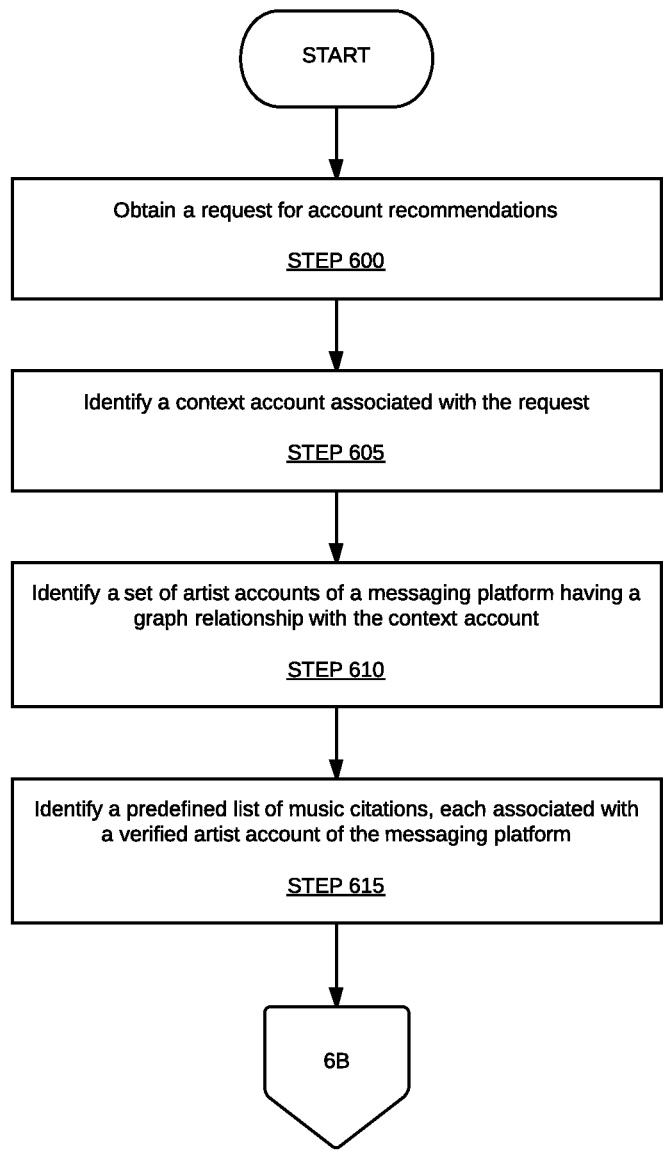
Figure 6B:
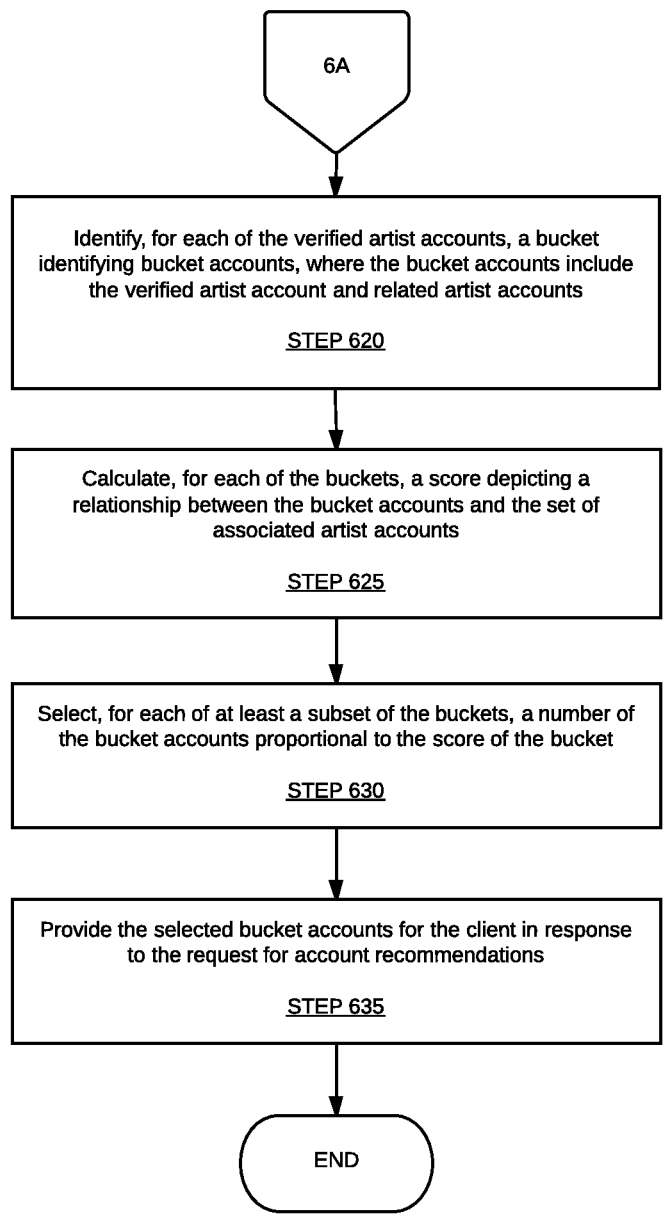

Referring to FIGS. 6A and 6B, in one or more embodiments, a request for account recommendations is received (Step 600) and a context account identified (Step 605). The context account can be, for example, a user account of the messaging platform for which the recommendations are requested. A set of artist accounts having a graph relationship with the context account is then identified (Step 610). The artist accounts can be selected from among all accounts of the messaging platfom1-, or a subset of accounts having one or more predefined characteristics/attributes. A predefined list of artist citations is then identified (Step 615), each authored by or otherwise associated with a verified account of the messaging platform.

Referring to FIG. 6B, a bucket is identified for each of the verified artist accounts (Step 620). Each bucket identifies one or more bucket accounts including the verified artist account and any number of related artist accounts. For each of the buckets, a score is calculated depicting a relationship between the bucket accounts and the set of associated artist accounts (Step 625). For at least a subset of the buckets (or, optionally, all of the buckets), a number of the bucket's accounts proportional to (or otherwise correlated with) the score of the bucket are selected (Step 630). Thus, if a bucket has a higher score, a larger number of that bucket's accounts may be selected. The bucket accounts may be selected based on any number of criteria for selecting top accounts from within a given bucket, in accordance with various embodiments. The selected bucket accounts from any number of buckets may then be provided for the client in response to the request for account recommendations (Step 635).

The steps of FIG. 3A can be performed by a music aggregation module (e.g., music aggregation module (145) of FIG. 1, discussed above) in conjunction with a music runtime engine (e.g., music runtime engine (150) of FIG. 1, discussed above). For example, the steps of FIGS. 3, 4A and/or 4B can be used to generate an aggregate list of songs, to generate a ranked list of songs, and/or to provide music-related recommendations to a client. In another example, the steps of FIGS. 5, 6A, and/or 6B can be used to provide account recommendations to a client.

In one or more embodiments of the invention, one or more steps of the flowcharts are repeated concurrently by multiple threads. Thus, one or more of the steps can be performed serially, in parallel, and/or by a distributed system, in accordance with various embodiments of the invention.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

FIGS. 7-10 show example user interfaces, in accordance with one or more embodiments of the invention. The example of FIG. 7 depicts a playback interface (705). In this example, the playback interface (705) is displayed over a grid of representations of artist accounts of the messaging platform. In one or more embodiments, the representation is an avatar, profile image, or other indication of each account and includes a username, display name, or other identifier of the account. In one embodiment, the playback interface (705) includes a "draft message" element (e.g., an icon or other user interface element) enabling the user to draft and broadcast a new message to the messaging platform, a "buy" element enabling purchase of a song from an external source. The playback interface can also include a progress indicator (710). In this example the progress indicator (710) is a circular or curved element wrapped around the play/pause button. The progress indicator (710) is filled proportionally with a color, pattern, or other visual indication as playback of a song progresses, until the entire circular progress element is covered.

The example of FIG. 8 depicts a grid of account representations. Each account representation represents an artist account of a messaging platform, and includes (optionally) a username of the account. Other optional information that may be included within the account representation includes, but is not limited to, an album name of a most recent album of the artist, a most popular or recent song of the artist, an album cover image, a profile image of the artist account, profile information of the artist account, and etc. The representations of the grid can be numbered according to a ranking of the albums or songs of the artists, and can be displayed in order of their ranking.

The example of FIG. 9 depicts a menu including a list of selectable links (900, 905, 910, 915, and 920). In this example, when a user selects menu item 900 ("Popular"), a set of songs is selected for display to the user based on (1) each song's relevance to an account of the user in the messaging platform and (2) the song's popularity both within the messaging platfom1 and externally. In this example, when a user selects menu item 905 ("Emerging"), a set of emerging songs is displayed to the user. Emerging songs can be identified by excluding songs and/or artists identified in an aggregate song list and/or aggregate artist list. In this example, when a user selects menu item 910 ("Suggested"), a set of account recommendations is displayed to the user. The recommendations can include artist accounts selected based on interests and engagements of the user and similar accounts in the messaging platform. In this example, when a user selects menu item 915 ("#NowPlaying"), a set of currently playing songs is displayed to the user. The set of songs may also include songs recently played by one or more accounts followed by or otherwise connected to the context account in the messaging platform.

In this example, songs played within a window of the past 5 minutes by connected accounts are ranked according to relevance, popularity, and recency and provided for display to the user of the context account. In this example, when a user selects menu item 920 ("Me"), a set of artist accounts followed by the context account is displayed to the user. FIGS. 3, 4A, 4B, 5, 6A, and 6B depict flowcharts for selecting the artists/songs described with regard to FIG. 9.

The example of FIG. 9 depicts a profile page of an artist. The profile page includes content from an artist account of the artist in the messaging platform, as well as a grid of account representations. The account representations display artist accounts connected to the artist account in the messaging platform. Thus, in this example, artists followed by the artist are displayed in the grid.

Each of the examples depicted by FIGS. 7-10 can be displayed by a client device communicatively connected to a messaging platform (e.g., client 105 of FIG. 1, discussed above).

Figure 11:
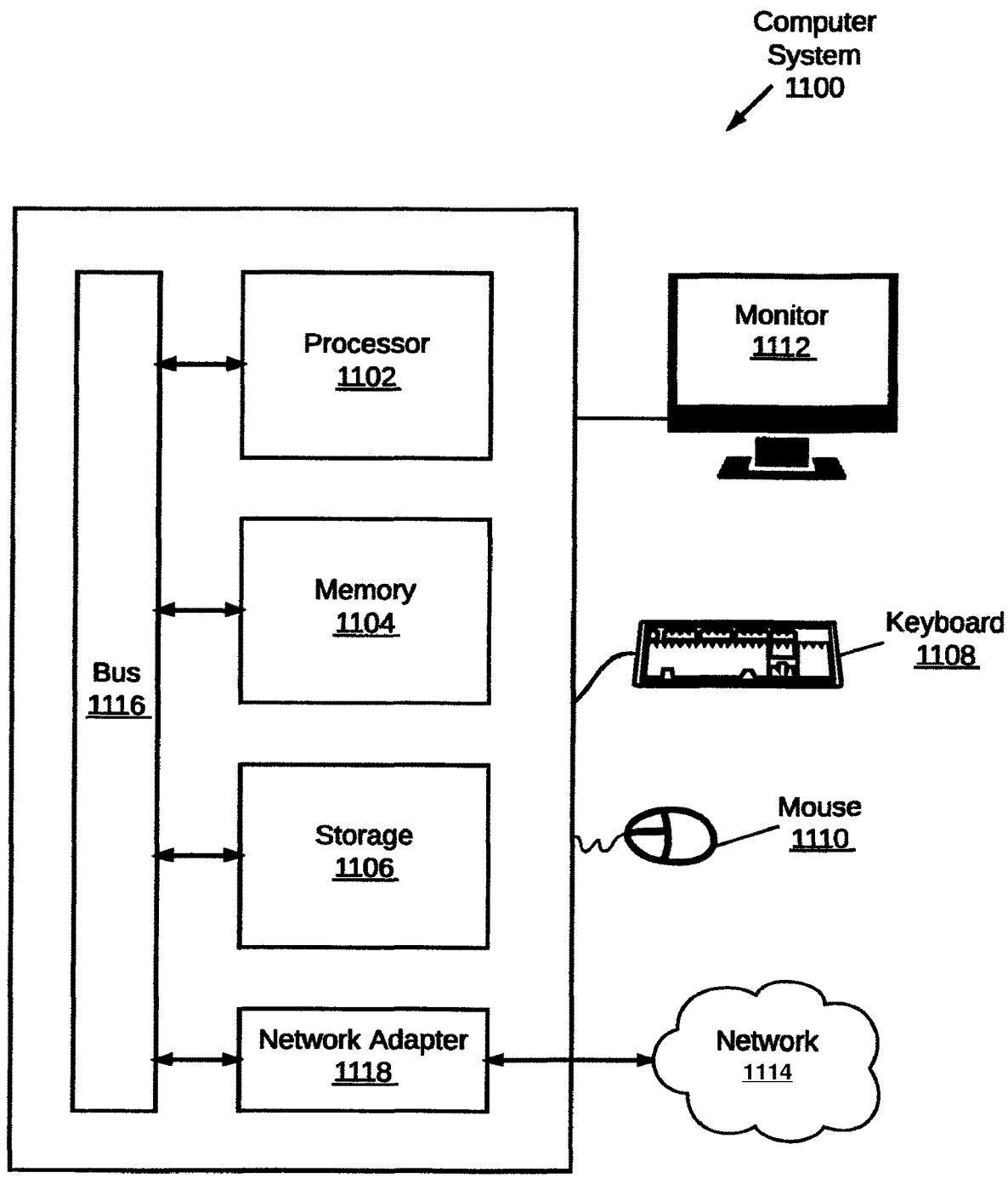
FIG. 11 shows a computer system, in accordance with one or more embodiments of the invention.

Embodiments of the invention may be implemented on a specialized computer system. For example, as shown in FIG. 11, a computer system (1100) includes one or more processor(s) (1102) (such as a central processing unit (CPU), integrated circuit, hardware processor, etc.), associated memory (1104) (e.g., RAM, cache memory, flash memory, etc.), a storage device (1106) (e.g., a hard disk, an optical drive such as a compact disk drive or digital video disk (DVD) drive, a flash memory stick, etc.), a network adapter (1118), and numerous other elements (not shown). One or more components of the computer system (1100) may be communicatively connected by a bus (1116). The computer system (1100) may also include input means, such as a keyboard (1108), a mouse (1110), or a microphone (not shown). Further, the computer system (1100) may include output means, such as a monitor (1112) (e.g., a liquid crystal display (LCD), a plasma display, or cathode ray tube (CRT) monitor). The computer system (1100) may be connected to a network (1114) (e.g., a local area network (LAN), a wide area network (WAN) such as the Internet, or any other type of network) via the network adapter (1118). Those skilled in the art will appreciate that many different types of computer systems exist, and the aforementioned input and output means may take other forms. Generally speaking, the computer system (1100) includes at least the minimal processing, input, and/or output means necessary to practice embodiments of the invention.

Further, in one or more embodiments of the invention, one or more elements of the aforementioned computer system (1100) may be located at a remote location and connected to the other elements over a network. Further, embodiments of the invention may be implemented on a distributed system having a plurality of nodes, where each portion of the invention (e.g., music runtime engine (150), music aggregation module (145), music repository (148), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

Further, one or more elements of the above described systems (e.g., music aggregation module (145), music runtime engine (150), music repository (148), etc. of FIG. 1, discussed above) can be implemented as software instructions in the form of computer readable program code stored, temporarily or permanently, on one or more non-transitory computer readable storage media. The non-transitory computer readable storage media are executable by one or more computer processors to perform the functionality of one or more components of the above-described systems (e.g., FIG. 1) and/or flowcharts (e.g., FIGS. 3, 4A, 4B, 5, 6A, and 6B), in accordance with various embodiments of the invention. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

One or more embodiments of the invention have one or more of the following advantages. By using message data from messages of a messaging platform as a signal for identifying music-related content, it may be possible to more accurately determine popularity of an artist and/or song. Furthermore, by utilizing a messaging data to determine popularity and/or popularity trends, it may be possible to provide more relevant music recommendations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium having stored thereon computer-readable instructions, which, when executed by a processor, cause the processor to perform operations, the operations comprising:

identifying a template defining a structure of a music citation;

identifying a set of messages of a messaging platform using the template, the set of messages identified as including a music citation corresponding to the structure defined by the template;

determining a score for the music citation of the set of messages;

identifying a first song or first artist based on the score of the music citation; and providing the identified first song or first artist as a recommendation to a user of the messaging platform.

2. The non-transitory computer readable medium of claim 1, wherein the score is determined based on a number of plays of the first song over a first time period, and a trend coefficient of the first song.

3. The non-transitory computer readable medium of claim 2, wherein the score is determined based on a product of the number of plays of the first song over the first time period with the trend coefficient of the first song, and wherein the trend coefficient is based on a percentage rate of change in number of plays of the first song within a second time period.

4. The non-transitory computer readable medium of claim 1, wherein the operations further comprise receiving, from the user, a request for the recommendation.

5. The non-transitory computer readable medium of claim 4, wherein the recommendation is determined based on a context account, and wherein the set of messages is identified as being for the context account.

6. The non-transitory computer readable medium of claim 5, wherein the context account is identified based on being an account of the user making the request for the recommendation.

7. The non-transitory computer readable medium of claim 5, wherein the request for the recommendation resulted from the user selecting a link in a message of the messaging platform, and wherein the context account is identified based on being an account associated with the message.

8. The non-transitory computer readable medium of claim 5, wherein the operations further comprise identifying a set of artist accounts of the messaging platform, the set of artist accounts identified based on having a graph relationship with the context account in a connection graph, and identifying, for each of the set of artist accounts, a bucket of related artist accounts of the messaging platform.

9. The non-transitory computer readable medium of claim 8, wherein each of the buckets of related artist accounts is identified based on performing attribute matching or relevance analysis on respective ones of the set of artist accounts.

10. The non-transitory computer readable medium of claim 9, wherein the operations further comprise determining a relevance score for each of the buckets of related artist accounts, the relevance score indicating a relevance of the bucket of related artist accounts to the set of artist accounts.

11. The non-transitory computer readable medium of claim 10, wherein the relevance score includes a ratio between (i) an intersection of the set of artist accounts and the bucket of related artist accounts, and (ii) a union of the set of artist accounts and the bucket of related artist accounts.

12. The non-transitory computer readable medium of claim 8, wherein identifying the first song or first artist comprises generating an aggregate list, and wherein the operations further comprise:

removing a second song or second artist from the aggregate list to generate an emerging list, wherein the second song or second artist is removed from the aggregate list based on determining that the second song or second artist is associated with a number of connections in the connection graph, and that the number of connections exceeds a predefined number.

13. The non-transitory computer readable medium of claim 1, wherein the operations further comprise:
identifying a set of websites associated with music;
extracting a music citation from the set of websites using the template;
presenting the extracted music citation to a human editor for approval or modification; and
storing a list of songs identified by the music citation from the set of websites.

14. The non-transitory computer readable medium of claim 1, wherein identifying the first song or first artist comprises generating an aggregate list, and wherein the operations further comprise removing a second song or second artist from the aggregate list to generate an emerging list.

15. The non-transitory computer readable medium of claim 14, wherein the second song or second artist is removed from the aggregate list based on determining that the second song or second artist is included in at least one of an external popularity list of songs or a digital media store.

16. A system comprising:
a messaging platform including messages, at least some of the messages including music citations;
a music aggregation module configured to identify a template defining a structure of a music citation, identify a set of messages of the messaging platform using the template, the set of messages identified as including a music citation corresponding to the structure defined by the template, the music aggregation module further configured to determine a score for the music citation of the set of messages, and identify a song or artist based on the score of the music citation; and
a music runtime engine configured to provide the song or artist identified by the music aggregation module as a recommendation to a user of the messaging platform.

17. The system of claim 16, wherein the music aggregation module determines the score based on a number of plays of the song over a first time period, and a trend coefficient of the song.

18. The system of claim 17, wherein the music aggregation module determines the score based on a product of the number of plays of the song over the first time period with the trend coefficient of the song, and wherein the trend coefficient is based on a percentage rate of change in number of plays of the song within a second time period.

19. The system of claim 18, wherein the recommendation is determined based on a context account, wherein the set of messages is identified as being for the context account, the system further comprising a graph fanout module configured to identify a set of artist accounts of the messaging platform as having a graph relationship with the context account, wherein for each of the set of artist accounts a bucket of related artist accounts of the messaging platform is identified, wherein each of the buckets of related artist accounts is identified based on attribute matching or relevance analysis performed on respective ones of the set of artist accounts, wherein the music runtime engine is further configured to determine a relevance score for each of the buckets of related artist accounts, the relevance score indicating a relevance of the bucket of related artist accounts to the set of artist accounts.

20. The system of claim 19, wherein the relevance score includes a ratio between (i) an intersection of the set of artist accounts and the bucket of related artist accounts, and (ii) a union of the set of artist accounts and the bucket of related artist accounts.

* * * * *